UNITED STATES PATENT OFFICE.

AVERY BROWN, OF FOND DU LAC, WISCONSIN.

IMPROVEMENT IN MEDICAL COMPOUNDS.

Specification forming part of Letters Patent No. 138,473, dated May 6, 1873; application filed March 1, 1873.

*To all whom it may concern:*

Be it known that I, Dr. AVERY BROWN, of Fond du Lac, in the county of Fond du Lac, in the State of Wisconsin, have invented a certain Compound called Dr. Brown's Compound Blood-Purifier, of which the following is a specification:

The nature of my invention consists in mixing three pounds of sarsaparilla, two pounds of lignum vitæ, three pounds of elder-blows, three pounds of burdock-root, three pounds of yellow-dock, two pounds of sassafras-bark, one-fourth pound of iodide of potash, four pounds of dandelion, five pounds of mandrake, one-fourth pound of bromide of potash, one and a half gallon alcohol, one ounce of wintergreen-oil together.

To prepare this compound, I take the forenamed ingredients, in about the proportions named, and mix them, with water sufficient to dissolve them, in a suitable vessel, and let them stand fourteen days. I then percolate the liquid and add nine pounds of crushed sugar, and put the whole in a vessel and hang it over the fire and bring it to a boil, when it is ready for bottling and for use.

I sometimes add to the aforenamed composition one pound of silk-weed, and sometimes add three pounds of cypripedium, and sometimes three pounds wild-cherry-tree bark.

These latter ingredients, or any portion of them, are added in the first place and steeped with the other ingredients.

I claim as my invention—

1. A compound composed of the first twelve articles named, in the proportions, and for the purposes set forth.

2. A compound composed of the first twelve articles with the addition of silk-weed, in the proportions substantially as described.

3. A compound composed of the first twelve articles with the addition of cypripedium, substantially as described.

4. A compound composed of the first twelve articles with the addition of wild-cherry-tree bark, substantially as set forth.

DR. AVERY BROWN.

Witnesses:
J. A. HAZARD,
GEO. R. HAZARD.